Feb. 23, 1954  B. BLOOMFIELD ET AL  2,669,904
METHOD OF GENERATING FACE AND TAPERED
GEARS WITH BOWED FORMATION
Filed March 1, 1948  2 Sheets-Sheet 1

Inventors
Benjamin Bloomfield
Donald S. Whitney
by Wright, Brown, Quinby
 & May Attys.

Inventors
Benjamin Bloomfield
Donald S. Whitney

Patented Feb. 23, 1954

2,669,904

UNITED STATES PATENT OFFICE 2,669,904

METHOD OF GENERATING FACE AND TAPERED GEARS WITH BOWED FORMATION

Benjamin Bloomfield and Donald S. Whitney, Springfield, Vt., assignors to The Fellows Gear Shaper Company, Springfield, Vt., a corporation of Vermont Application March 1, 1948, Serial No. 12,266

8 Claims. (Cl. 90—1.6)

The purpose of this invention is to generate face gears, and tapered gears also, in such fashion that the generated tooth faces are bowed or crowned, with convex curvature, in the length dimension of the teeth. For the purpose of this specification, the length dimension of a face gear tooth is defined as the dimension radially of the gear; and that of a tapered gear is the dimension lengthwise of the gear. The term "generating" and words of similar import include, not only generation in the course of initially cutting teeth from a previously uncut work piece, but also generation in the course of finishing a cut gear by the operation of a shaving cutter, a lapping tool of gear form, or a cutter of other type conjugate to the gear being finished.

While it has been common heretofore to produce bowed or crowned tooth formations in gears of cylindrical character (i. e., external or internal spur or helical gears of which the teeth are equidistant throughout their length from the axis of the gear), by various means, no way has been known heretofore for giving equivalent crowned or bowed formation to face gears and tapered gears. It has been our object to enable such formation to be given to face gears and tapered gears, and the present invention consists in a procedure and means for doing so.

Summarily stated, the invention comprises cutting or finishing the teeth of the work piece by the use of a cutting or finishing tool which is similar to a given pinion which meshes correctly with the finished work gear, but either has a larger number of teeth than such mating pinion, or is preferably over size or enlarged with respect to such mating pinion, or is both over size and possessed of more teeth than the mating pinion. Such cutter and the work piece are rotated simultaneously about their respective axes in accordance with the principles of the molding generating process of gear production. The principle thus stated in general terms is explained in the following specification with reference to accompanying illustrative drawings, in which—

Figure 2:
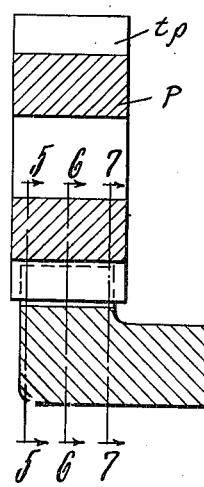
Fig. 2 is a section in the common axial plane of the pinion and face gear shown in Fig. 1.
Figure 5:
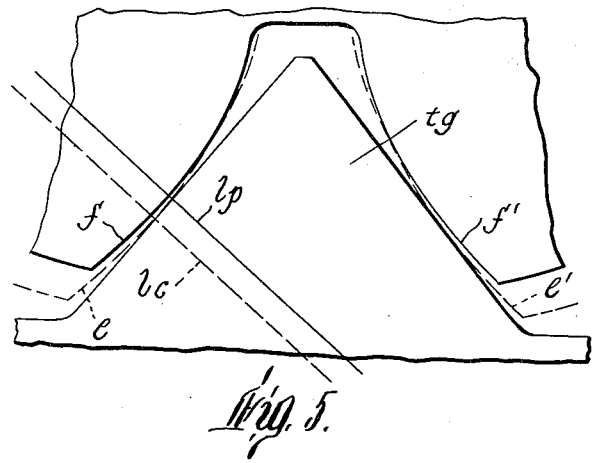
Figure 6:
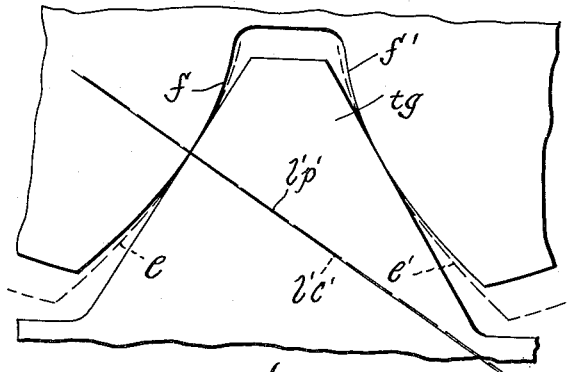
Figure 7:
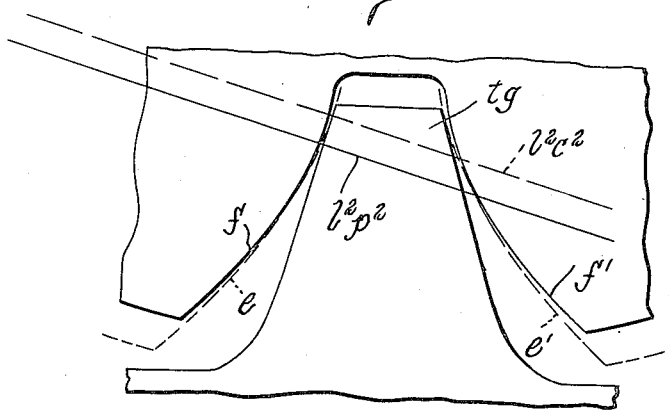

Figs. 5, 6 and 7 are developed sections of one of the teeth of the face gear taken on lines 5—5, 6—6 and 7—7 of Fig. 2, shown on a much enlarged scale and showing two of the pinion and cutter teeth in cooperating relation therewith.

Figure 1:
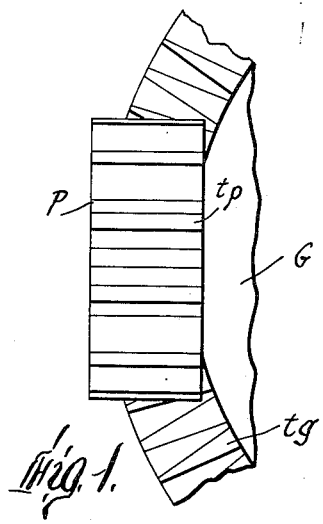
Fig. 1 is a plan view of a spur pinion and face gear couple, of which the face gear teeth are bowed in the manner described.

A typical face gear and pinion couple is shown in Figs. 1 and 2, in which G represents the face gear and P the conjugate spur pinion which correctly meshes with the gear; the gear and pinion being disposed with their axes intersecting at right angles. The teeth of the pinion are designated $tp$ and those of the gear are designated $tg$, the latter being generated in an annular rib on one face of the gear at its circumference and being disposed radially thereof.

The crowning effect of the face gear teeth obtained by the present invention creates clearances between the meshing teeth at the inner and outer ends of the gear teeth and limits the contact area to a region intermediate the ends; such clearances being of gradually diminishing width toward the contact area. Such clearances and contact area are shown in Figs. 5, 6 and 7, which are enlarged developed sections of one of the gear teeth $tg$ near the outer end, mid length, and inner end, respectively, of the gear tooth. Also shown in these views are the outlines of the adjacent faces of two pinion teeth embracing the gear tooth in operative meshing relation therewith. The pinion tooth faces are shown by full lines designated $f$ and $f^1$.

The lines of action of the pinion with the gear in the planes designated when in counter-clockwise rotation, with respect to these drawings, are shown at $lp$, $l'p'$ and $l^2p^2$, respectively, in these figures. The lines of action in clockwise rotation are not here shown, but are opposite and symmetrical to those shown. It will be seen that contact or bearing occurs on the line of action $l'p'$ in the plane 6—6, while there is clearance on the lines of action $lp$ and $l^2p^2$ at the outer and inner circumferences, respectively, of the tooth bearing rib of the gear.

This condition is brought about by the use of a gear-like cutter which may have a greater number of teeth than the pinion P, but of equal pitch, or may be oversized with respect to the pinion, or may have a combination of more teeth and greater size of teeth. Cutters having this combination of features will be most commonly used, and such a one is illustratively indicated in these drawings. The outlines of the cutting edges, or operative faces, of two teeth of such a cutter, in positions corresponding to those of the pinion here represented, are indicated by broken lines at $e$ and $e^1$ in Figs. 5, 6 and 7. The curves $e$ and $e^1$ are involutes of a larger base circle than that of the pinion tooth face curves, and the cutter, in performing its generating action, is located at a greater center distance from the gear than the mating position of the pinion. Hence the cutter generates the side faces of the gear teeth on lines of action $lc$, $l'c'$ and $l^2c^2$ (in the three designated planes respectively). The line of action of the cutter in the plane 5—5 is nearer to the root of the gear tooth than the line of action of the pinion, in the plane 7—7 is nearer the crest of the gear tooth than the pinion line of action, and in the plane 6—6 the lines of action of both approximately coincide. There is one position between the ends of the gear teeth where both lines of action exactly coincide.

Owing to the flatter curvature of the cutter involute curves than of the pinion curves, and the fact that the cutter and pinion faces are tangent at the points where the coincident lines of action cross them, the cutter generates the clearances above described. The bearings of the pinion and gear teeth gradually diminish and the clearances gradually increase in width toward each end of the teeth from the intermediate area where full bearing occurs.

Figure 4:
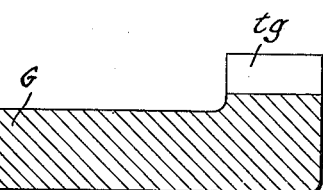
Fig. 4 is an enlarged view of the adjacent sides of two teeth of the pinion and cutter in their correlated relationship when the intermediate space is at the mid point in the arc of action with the face gear.
Figure 3:
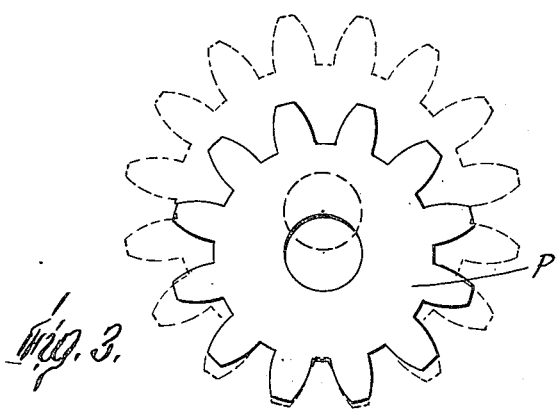
Fig. 3 is an end view of the pinion gear superposed on a cutter so related to the pinion as to produce a given crowning effect on the face gear teeth.

A more comprehensive illustration of the relationship between the pinion and cutter is given by Fig. 4 where the point $a$ designates the axis of the pinion and the arc $bc$ its base circle; $a'$ designates the axis of the cutter and the broken line arc $b'c'$ designates the base circle of the cutter. The outlines of the pinion and cutter teeth and the lines of action in the three planes referred to are designated by the same reference characters as in Figs. 5, 6 and 7. In Fig. 3 the entire pinion and cutter are shown with one superposed on the other.

The cutters used for this purpose may be either gear shaper cutters, which have teeth like gear teeth, but with cutting edges at one end and side clearance back from that end; or shaving cutters, which have teeth like gear teeth with slots or gashes bounded by cutting edges intermediate their ends; or lapping tools, which are like gears and are used with an abrasive. Gear shaper cutters can generate the teeth of a gear from an uncut blank, while cutters of any of these types can be used for finishing, with desired crowning effect, gear teeth which have been previously cut.

Gears are crowned by this method for limited bearing (of the character previously described) with pinions of specific numbers of teeth. In the case of any designated face gear and pinion couple, where the crowning effect is desired, the cutter selected is one which has a greater number of teeth than the designated pinion or is oversized with respect thereto, or is both oversized and has more teeth. In general the crowning effect is greater with greater excess in the number of cutter teeth and/or greater enlargement of the cutter, although not in direct ratio. Enlargement or over size of a cutter is related to the pinion which is designed to mesh correctly with the face gear in a prescribed pitch relationship. The teeth of the over size tool are involutes of a base circle having the same diameter as that of the pinion but are of greater width and the cutter is set at a center distance from the face gear greater than that on which the pinion is designed to run.

The cutting action and generative rotation when a shaping cutter is used may be reciprocation of the cutter and coordinated rotation of cutter and work piece according to the general principle illustrated in the patent of E. R. Fellows 982,531, January 24, 1911, or it may be continuous rotation of both with gradual progression of the cutter, as illustrated in the patent of E. W. Miller 2,308,891, January 19, 1943. When a shaving cutter or burnishing tool is used, the tool and work piece are rotated about their respective axes with a gradual relative reciprocation in the direction of the axis of the tool.

The same effect, (that is, of a crowned tooth and more or less localized bearing), can also be obtained in exactly the same manner in an offset type of face gear by locating the cutter relative to the work so that its axis is offset to one side or the other of the work gear axis. Likewise crowned face gears to mesh with helical pinions on either intersecting axes or offset may be generated by using helical cutters, as fully explained in the above mentioned Miller patent. In all cases a cutter is used either having more teeth than the pinion with which the face gear is designed to mesh or being preferably over size, or (preferably) both.

In the illustration of the accompanying drawings, the center of bearing area is midway between the ends of the face gear teeth. This is not an invariable or essential condition, and occurs only when the axis of the cutter is in a plane perpendicular to the axis of the work gear. By locating the cutter with its axis inclined in one direction or the other to such plane, it is possible to make the gear teeth relatively thinner than as herein shown at either the inner or outer end, and consequently shift the area of bearing toward the inside or outside circumference of the tooth bearing rib. By proper selection of the angle of the cutter, the designer can locate the bearing area in any position desired.

The principles herein described are equally applicable to produce crowned formations and localized bearings on the teeth of tapered gears. A tapered gear is defined as a gear designed to mesh with an ordinary spur or helical gear, either external or internal, with its axis at an angle other than 0° or 90° with the mating gear and either intersecting or offset from that axis. In applying these principles to such gears, a cutter is employed having characteristics as to number of teeth, and size, corresponding to those previously described.

As a generic designation including such tapered gears and face gears, we may call them gears of non-cylindrical character. As previously stated in this specification, a gear of cylindrical character is one in which the several teeth are at the same distance throughout their length from the axis on which the gear is designed to rotate, whether or not all of the teeth are equidistant from such axis. All gears of which the teeth are progressively nearer to the axis of rotation at successive locations along their length are considered to be non-cylindrical gears. All tapered gears, and face gears, are within this category.

What we claim is:

1. A method of producing a tapered gear with teeth having oppositely bowed formations on their side faces, and which gear has been designed to mesh at a given center distance with a pinion of cylindrical gear characteristics, which consists of engaging said gear with a cutter, said cutter having cylindrical gear characteristics with a base circle greater than said pinion and being oversized with respect to said pinion, so that the center distance between cutter and gear is greater than that between pinion and said gear and effecting a relative cutting and generating movement between said cutter and gear.

2. A method of producing a face gear with teeth having oppositely bowed formations on their side faces, and which gear has been designed to mesh at a given center distance with a pinion of cylindrical gear characteristics, which consists of engaging said gear with a cutter, said cutter having cylindrical gear characteristics with a base circle greater than said pinion and being oversized with respect to said pinion, so that the center distance between cutter and gear is greater than that between pinion and said gear and effecting a relative cutting and generating movement between said cutter and gear.

3. A method of producing a tapered gear with teeth having oppositely bowed formations on their side faces, and which gear has been designed to mesh at a given center distance with a pinion of cylindrical gear characteristics, which consists of engaging said gear with a cutter, said cutter having cylindrical gear characteristics with a base circle greater than said pinion and being oversized with respect to said pinion and having a larger number of teeth than said pinion, so that the center distance between cutter and gear is greater than that between pinion and said gear and effecting a relative cutting and generating movement between said cutter and gear.

4. A method of producing a face gear with teeth having oppositely bowed formations on their side faces, and which gear has been designed to mesh at a given center distance with a pinion of cylindrical gear characteristics, which consists of engaging said gear with a cutter, said cutter having cylindrical gear characteristics with a base circle greater than said pinion and being oversized with respect to said pinion and having a larger number of teeth than said pinion, so that the center distance between cutter and gear is greater than that between pinion and said gear and effecting a relative cutting and generating movement between said cutter and gear.

5. A method of producing a tapered gear with teeth having oppositely bowed formations on their side faces, and which gear has been designed to mesh at a given center distance with a pinion of cylindrical gear characteristics, which consists of engaging said gear with a cutter, said cutter having cylindrical gear characteristics with a base circle greater than said pinion and being oversized with respect to said pinion and having a larger number of teeth than said pinion, so that the center distance between cutter and gear is greater than that between the pinion and said gear, rotating said cutter and gear relatively and feeding said cutter along its axis relative to said gear.

6. A method of producing a face gear with teeth having oppositely bowed formations on their side faces, and which gear has been designed to mesh at a given center distance with a pinion of cylindrical gear characteristics, which consists of engaging said gear with a cutter, said cutter having cylindrical gear characteristics with a base circle greater than said pinion and being oversized with respect to said pinion and having a larger number of teeth than said pinion, so that the center distance between cutter and gear is greater than that between pinion and said gear, rotating said cutter and gear relatively and feeding said cutter along its axis relative to said gear.

7. A method of producing a tapered gear with teeth having oppositely bowed formations on their side faces, and which gear has been designed to mesh at a given center distance with a pinion of cylindrical gear characteristics, which consists of engaging said gear with a cutter having a greater base circle than said pinion, with the axis of rotation of said cutter disposed in a plane located at a substantial angle to the axis of said gear, said cutter having cylindrical gear characteristics and being oversized with respect to said pinion so that the center distance between cutter and gear is greater than that between the pinion and said gear, and effecting a relative cutting and generating movement between said cutter and gear.

8. A method of producing a face gear with teeth having oppositely bowed formations on their side faces, and which gear is so shaped as to mesh at a given center distance with a pinion of cylindrical gear characteristics, which consists of engaging said gear with a cutter having a greater base circle than said pinion, said cutter having cylindrical gear characteristics and being oversized with respect to said pinion and having a larger number of teeth than said pinion, the axis of rotation of the cutter being located in a plane perpendicular to the axis of said gear, placing the axis of the cutter from the face of the gear at a greater distance than that between the pinion and said gear, rotating said cutter and gear relatively, and feeding said cutter along its axis relative to said gear.

BENJAMIN BLOOMFIELD.
DONALD S. WHITNEY.

References Cited in the file of this patent

UNITED STATES PATENTS

| Number | Name | Date |
|---|---|---|
| 982,581 | Fellows | Jan. 24, 1911 |
| 2,249,252 | Mentley | July 15, 1941 |
| 2,308,891 | Miller | Jan. 19, 1943 |
| 2,309,530 | Perkins | Jan. 26, 1943 |
| 2,317,161 | Witham | Apr. 20, 1943 |
| 2,354,670 | Drummond | Aug. 1, 1944 |
| 2,362,787 | Williamson | Nov. 14, 1944 |